(12) United States Patent
Vlutters et al.

(10) Patent No.: US 7,385,907 B2
(45) Date of Patent: Jun. 10, 2008

(54) REWRITABLE OPTICAL RECORD CARRIER

(75) Inventors: Ruud Vlutters, Eindhoven (NL);
Wilhelmus Robert Koppers,
Eindhoven (NL); **Pierre Hermanus
Woerlee, Eindhoven (NL); Mark Van
Schijndel**, Eindhoven (NL)

(73) Assignee: Koninklijke Philips Electronics N.V.,
Eindhoven (NL)

( * ) Notice: Subject to any disclaimer, the term of this patent is extended or adjusted under 35 U.S.C. 154(b) by 530 days.

(21) Appl. No.: 10/540,700

(22) PCT Filed: Dec. 18, 2003

(86) PCT No.: PCT/IB03/06131

§ 371 (c)(1),
(2), (4) Date: Jun. 24, 2005

(87) PCT Pub. No.: WO2004/059631

PCT Pub. Date: Jul. 15, 2004

(65) Prior Publication Data

US 2006/0104189 A1 May 18, 2006

(30) Foreign Application Priority Data

Dec. 30, 2002 (EP) .................................. 02080579

(51) Int. Cl.
*G11B 7/24* (2006.01)
*B32B 3/02* (2006.01)

(52) U.S. Cl. ................... 369/275.2; 369/275.4; 369/283; 369/288; 428/64.4; 428/64.1

(58) Field of Classification Search .. 369/275.1–275.5, 369/288, 283; 428/64.1–64.7, 457; 430/270.13
See application file for complete search history.

(56) References Cited

U.S. PATENT DOCUMENTS

| | | | | |
|---|---|---|---|---|
| 5,935,672 | A * | 8/1999 | Zhou et al. | 428/64.1 |
| 6,040,066 | A * | 3/2000 | Zhou et al. | 428/641 |
| 6,254,957 | B1 * | 7/2001 | Zhou | 428/64.1 |
| 6,638,594 | B1 * | 10/2003 | Zhou | 428/64.4 |

* cited by examiner

*Primary Examiner*—Ali Neyzari
(74) *Attorney, Agent, or Firm*—Michael E. Belk

(57) ABSTRACT

A rewritable optical record carrier comprising a first substrate carrying a first recording stack of layers, which recording stack comprises, a first dielectric layer, a recording layer comprising a phase-change recording material, a second dielectric layer, and a metal mirror layer. In order to achieve a maximum R*M said first dielectric layer has a thickness d1 in the range of 20 nm to 50 nm, and said second dielectric layer has a thickness d2 according to the relation $0.0225 * d_2^2 - 2.6572 * d_2 + 173.3$ (nm) $< d_1 < 0.0225 * d_2^2 - 2.6572 * d_2 + 213.3$ (nm) when the mirror layer comprises aluminum, or a thickness $d_2$ according to the relationship $0.0191 * d_2^2 - 2.0482 * d_2 + 149.6$ (nm) $< d_1 < 0.0191 * d_2^2 - 2.0482 * d_2 + 189.6$ (nm) when the mirror layer comprises silver.

7 Claims, 4 Drawing Sheets

REWRITABLE OPTICAL RECORD CARRIER

The present invention relates to a rewritable optical record carrier comprising a substrate carrying a recording stack (IPIM) of layers, which recording stack comprises, in this order, a first dielectric layer ($I_1$), a recording layer (P) comprising a phase-change recording material (PC), a second dielectric layer ($I_2$), and a mirror layer (M) composed of a mixture comprising aluminum as a main component or composed of a mixture comprising silver as a main component. The present invention further relates to such a rewritable optical record carrier with a recording stack (MIPI) comprising said layers in reverse order.

Throughout all known rewritable optical recording media such as CD-RW, DVD-RAM, DVD-RW, DVD+RW, and Blu-Ray disc (BD) a recording stack is applied comprising such a phase-change recording layer. The PC layer commonly is sandwiched in a stack between two dielectric ZnS—$SiO_2$ layers. Presently, the medium of choice for erasable phase-change recording is an alloy with a durable polycrystalline structure, e.g. an alloy composed of Sb and Te in additions of In, Ge, and/or Ag. On one side of such a recording stack a mirror layer is disposed which is typically made of metal such as gold, silver or aluminum. With its other side the recording stack is disposed on a substrate such as a polycarbonate substrate. A writing laser beam modulated according to a recording signal entering the recording medium from the substrate side is focused on the recording stack. While the disc is moved with respect to the focused laser beam the latter is principally absorbed by the recording layer. Thereby, the alloy is locally heated. When the temperature exceeds its melting point (about 500° C. to 700° C.) the phase change material converts to an amorphous state. A rapid heat dissipation through the adjacent dielectric layers causes a fast cooling of the alloy, thereby stabilizing the amorphous phase. Thus, written marks remain along the track. Applying a laser beam with a reduced power allows to erase written marks. Thereby, the recording layer is heated to a temperature of about 200° C. inducing a phase change back to the crystalline phase (annealing). Since the atoms must be kept at elevated temperatures long enough to recrystallize, crystallization is a rather slow process although amorphization in PC media can be very rapid.

Whereas the stack has a high reflectivity in the crystalline phase (ground state) the reflectivity is reduced in the amorphous phase (written state). Therefore, a reading beam focused on said recording stack is reflected by the recording layer with different intensity depending on whether it strikes a written mark (pit) or an unwritten area (land). Thus, the dielectric layers and the reflective layer perform several tasks: protecting the recording layer, creating an optically tuned structure that has optimized reflectivity and/or absorptivity, allowing the tailoring of the thermal properties of the disk for rapid cooling.

Rewritable optical record carriers as well as recording media in general have seen an evolutionary increase in data capacity due to an explosively increasing amount of data to be provided in multimedia applications, for example. The data capacity of rewritable optical record carriers evolved from 650 MB (CD, NA=0.45, λ=780 nm) to 4.7 GB (DVD, NA=0.65, λ=650 nm) and is finally going to evolve towards 25 GB (Blu-Ray disk (BD), NA=0.85, λ=405 nm). The data capacity can further be multiplied by increasing the number of recording stacks per disc. So called double recorded layer stack designs are known from DVD-ROM. Therein, two recorded layers are arranged in a stack with a spacer between them on the same substrate. The recording layers in these kind of discs are accessible from the same only.

However, due a significant absorption of the laser light in rewritable recording carriers recording and readout of information on a double recording layer stack within such a medium is more difficult. The laser beam has to be strong enough to write on the second recording stack ($L_1$) which is the farthest one with respect to the propagation direction of the incident laser beam even after a significant amount of its power has been absorbed by the first recording stack ($L_0$) which is the closest one with respect to the propagation direction of the incident laser beam. Therefore, these multiple layer stacks are not specified for rewritable optical record carriers so far.

Simultaneously with the increasing demand for data capacity, the demand for a high data rate in phase-change optical recording increases. A high data rate requires the recording layer to have a high crystallization rate, i.e. a short crystallization time. To ensure that the previously recorded marks can be recrystallized during direct overwrite (DOW), for example, as mentioned above the recording layer should have a proper crystallization time to match the linear velocity of the spinning recording carrier relative to the laser beam. If the crystallization speed is not high enough to match the linear velocity old date (amorphous marks) from a previous recording cannot be completely erased. The remaining old data fragments will cause a high noise level.

Recently, in US 2001 0036527, in US 2001 00365278, WO 01/13370 rewritable optical recording media with sufficient recording properties to meet optical ranges predetermined by the DVD-standards, such as jitter, optical contrast, and modulation, even at high linear velocities were proposed. However, these recording carriers, again, comprise $L_0$ recording stacks having a transmission of 40%-60%. Since the laser power arriving at $L_1$ is reduced that much the $L_1$ recording stack has to be very sensitive especially at high linear velocities. On the other hand the L1 stack has to have a very high reflectivity since the light of a reading laser beam reflected at the second recording stack $L_1$ will be once more attenuated on its way back through the $L_0$ stack to the detector.

Therefore, it is an object of the present invention to provide a rewritable optical record carrier with a stack design that provides better optical properties with regard to sensitivity and reflectivity.

According to the present invention this object is achieved by rewritable optical record carriers as described in the opening paragraph with a recording stack comprising said layers in said order (IPIM) which is characterized in that said first dielectric layer has a thickness $d_1$ in the range of 100 nm to 200 nm, and said second dielectric layer has a thickness $d_2$ according to the relation $$0.0225*d_2^2 - 2.6572*d_2 + 173.3(\text{nm}) < d_1 < 0.0225*d_2^2 - 2.6572*d_2 + 213.3(\text{nm}) \quad (1)$$

when the mirror layer comprises aluminum and according to the relation $$0.0191*d_2^2 - 2.0482*d_2 + 149.6(\text{nm}) < d_1 < 0.0191*d_2^2 - 2.0482*d_2 + 189.6(\text{nm}) \quad (1)$$

when the mirror layer comprises silver.

According to a second aspect of the present invention these objects are achieved by a rewritable optical record carrier as described in the opening paragraph with a recording stack comprising said layers in reverse order (MIPI) which is characterized in that said first dielectric layer $I_1$ has a thickness $d_1$ in the range of 100 nm to 200 nm, and said second dielectric layer $I_2$ has a thickness $d_2$ according to relation (1) when the mirror layer comprises aluminum and according to relation (2) when the mirror layer comprises silver.

According to a third aspect which constitutes a further development of the first or second aspect of the invention, said second dielectric layer $I_2$ has a thickness in the range of 20 nm to 50 nm.

According to a fourth aspect which constitutes a further development of the first or second aspect of the invention, said first dielectric layer $I_1$ has a thickness in the range of 110 nm to 150 nm, and said second dielectric layer $I_2$ has a thickness in the range of 25 nm to 40 nm.

Whereas, the development of recording stacks proposed for use in a rewritable optical record carrier earlier was focused on a high optical contrast the rewritable optical record carrier according to the present invention comprises a recording stack which is optimized with regard to a maximum R*M which corresponds to the crystalline reflection ($R_c$) minus amorphous reflection ($R_a$), therefore, also referred to as $R_c$-$R_a$. As will be seen from the following examples this leads to a much higher reflectivity. Furthermore, the sensitivity, that is the laser power needed for writing a mark, could be increased.

The above an other objects, features and advantages of the present invention will become apparent from the following description of preferred embodiments thereof taken in conjunction with the accompanying drawings in which FIG. 1 shows a cross sectional view of a common rewritable optical record carrier;

Figure 1:
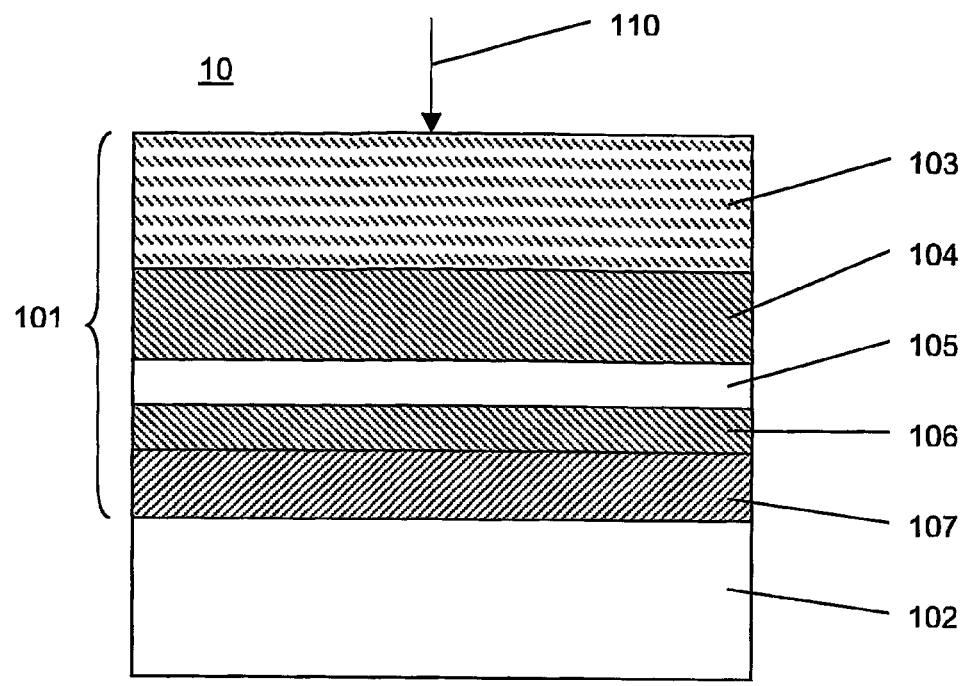

Current rewritable optical record carriers 10 as shown in FIG. 1 comprise a single recording stack 101 fixedly disposed onto a so called dummy stack or dummy substrate 102. Herein, all declarations regarding positions and/or directions of layers and their arrangement relate to the direction of the incident laser beam indicated by arrow 110. The upper single recording stack 101 also accounted as $L_0$ is the stack closest to the entrance surface of the beam. As outlined above, the known recording stacks concerning their reflectivity and sensitivity are not adapted for use in a subjacent stack $L_1$. Due to the small amount of light being transmitted through the top layers 101 they don't have enough sensitivity for recording and further too less reflectivity for reading information in a second level. Therefore, dummy stack 102 is simply made of polycarbonate. The dummy stack 102 and the recording stack 101 normally are fixed by an adhesive layer and a spacer layer (not shown). The recording stack 101 comprises a polycarbonate substrate 103 on top onto which a first dielectric layer 104 is laminated. This layer 103 is made of a mixture of ZnS and $SiO_2$, e.g. $(ZnS)_{80}(SiO_2)_{20}$, and has a thickness in the range of 60 nm to 85 nm. The next subjacent layer is a recording layer 105, e.g. made of GeInSbTe with a thickness in the range of 12 nm to 18 nm. Attached to the recording layer 105 on the opposite side of said first dielectric layer 104 one can find a second dielectric layer 106 also made of ZnS—$SiO_2$ having a thickness of 12 nm to 20 nm. The lowest layer pertaining to the $L_0$ stack is a metallic mirror layer 107, mostly made of silver or gold. All layers of the recording stack 101 are subsequently sputter-laminated, in the order as listed above, thereby forming an IPIM-stack.

Figure 2:
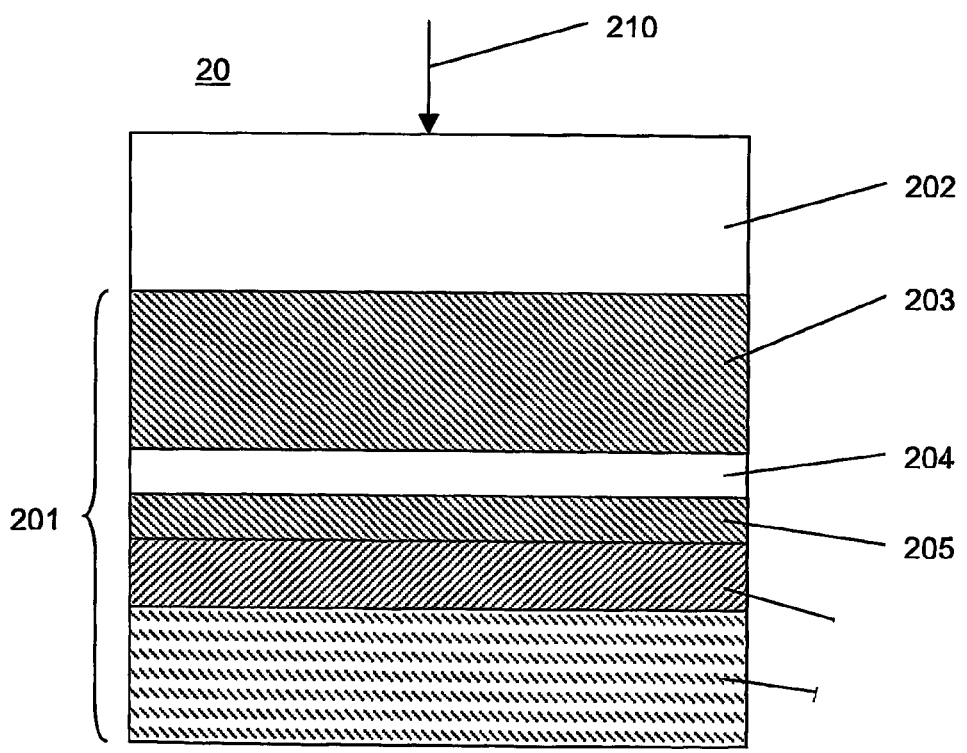
FIG. 2 illustrates a cross sectional view of a rewritable optical record carrier according to a preferred embodiment of the present invention.

As can be seen in FIG. 2, the rewritable optical record carrier 20 in accordance with the present invention comprises a recording stack 201 as second stack $L_1$ with regard to the direction of the incident light beam as indicated by arrow 210. On top of the $L_1$ stack a first transparent recording stack $L_0$ 202 may be deposited with a spacer layer (not shown) in between both stacks 201 and 202. Such a transparent recording stack typically has a transmission between 40% and 60%. As will be seen later, the $L_1$ recording stack 201 according to the present invention other than known recording stacks due to its high reflectivity and sensitivity is perfectly adapted for recording under that conditions.

The $L_1$ recording stack 201 comprises, top-down, a first $(ZnS)_{80}(SiO_2)_{20}$ dielectric layer 203 also referred to as $I_1$ which is between 100 and 200 nm, and preferably between 120 nm and 160 nm thick, further a recording layer 204, e.g. made of GeInSbTe with a thickness in the range of 12±1.5 nm. Adjacent to said recording layer 204 opposite the first dielectric layer 203 there is a second dielectric $(ZnS)_{80}(SiO_2)_{20}$ layer 205 also referred to as $I_2$ which is between 20 nm and 50 mm, and preferably between 25 nm and 40 nm thick. Subjacent hereto a mirror layer 206 is arranged. It is made of a metal or metal alloy, preferably aluminium, a mixture of Al with some percentage of Ti, or gold. This mirror layer typically is about 50 nm thick. Finally, the bottom layer of the $L_1$ recording stack 201 is a substrate 207 made of polycarbonate for example. The above arrangement of layers, namely the first dielectric layer 203, the recording layer 204, the second dielectric layer 205, and the mirror layer 206, is laminated onto said substrate 207 in reverse order as opposed to the numeration, thereby forming a MIPI-stack.

Figure 3:
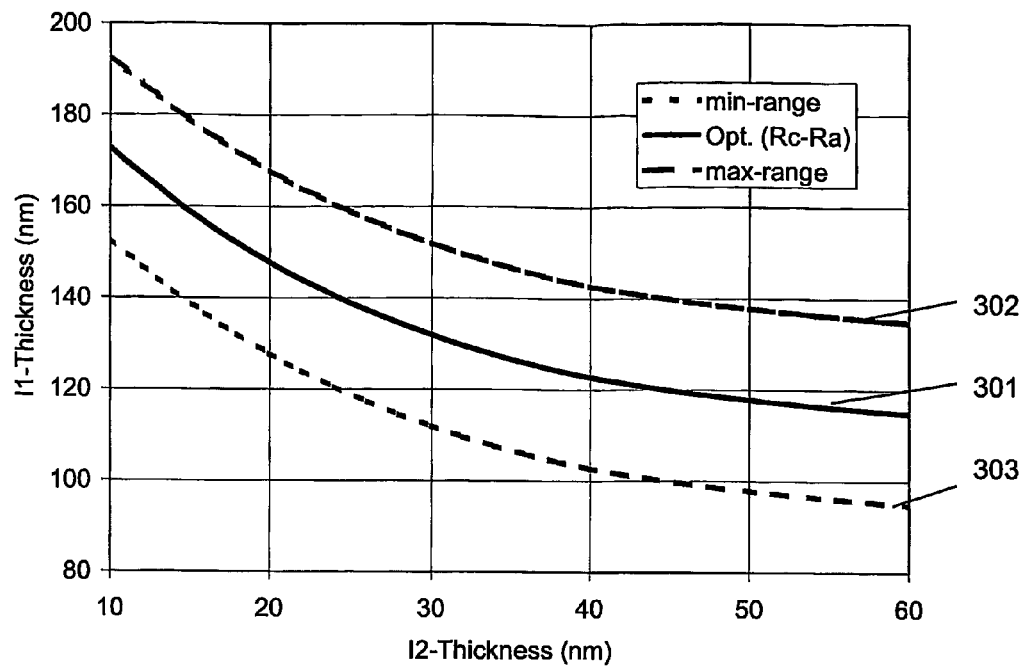
FIG. 3 shows a combination of $I_1$ layer thickness and $I_2$ layer thickness of a recording stack according to present invention comprising an aluminum mirror layer resulting in maximum $R_c$-$R_a$.
Figure 4:
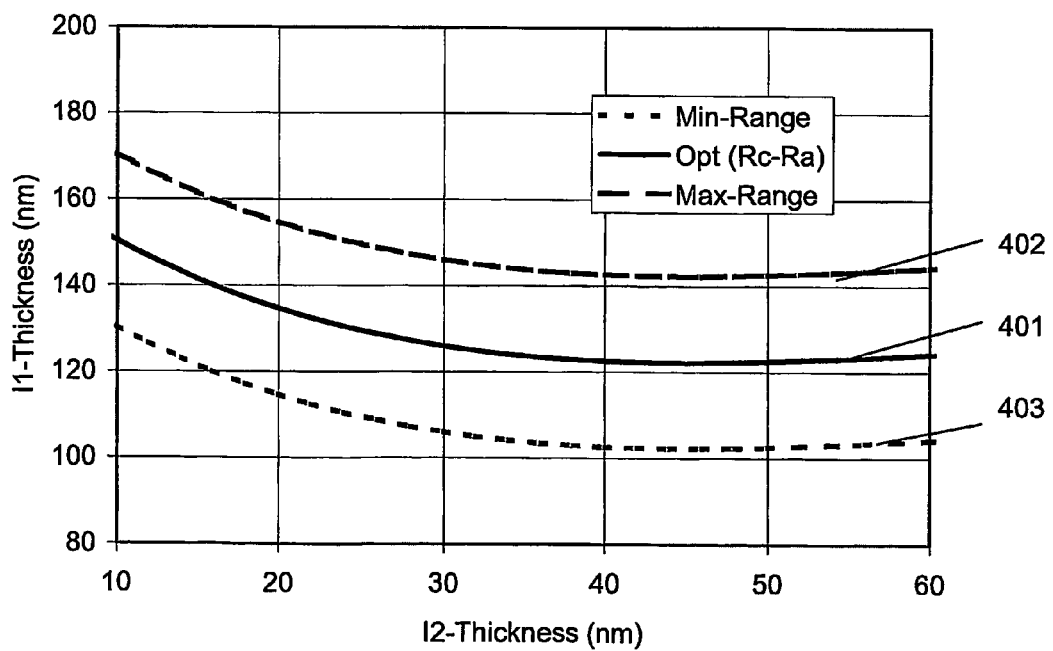
FIG. 4 shows a combination of $I_1$ layer thickness and $I_2$ layer thickness of a recording stack according to present invention comprising a silver mirror layer resulting in maximum $R_c$-$R_a$.

The recording stacks commonly used in optical record carriers are not optimized with respect to a maximum reflection and, particularly, to maximum reflection difference R*M (=$R_c$-$R_a$, crystalline reflection $R_c$ minus amorphous reflection $R_a$). This is illustrated in FIGS. 3 and 4, wherein the solid lines 301, 401 denote the maximum of the reflection difference for recording stacks comprising an aluminium mirror-layer, FIG. 3, and a silver mirror layer, FIG. 4, respectively. The combination of $I_1$ layer thickness and $I_2$ layer thickness of a recording stack according to present invention should be chosen along these maximum $R_c$-$R_a$ lines 301, 401, respectively, which can be recorded in the following formulas wherein $d_1$ denotes the $I_1$ layer thickness and $d_2$ denotes the $I_2$ layer thickness:

a) For the reflector stack comprising a aluminium mirror layer $$0.0225*d_2^2-2.6572*d_2+173.3(nm)<d_1<0.0225*d_2^2-2.6572*d_2+213.3(nm)$$

b) For the reflector stack comprising a silver mirror layer:

$$0.0191*d_2^2-2.0482*d_2+149.6(nm)<d_1<0.0191*d_2^2-2.0482*d_2+189.6(nm)$$

As the $I_1$ layer thickness in common rewritable DVD is in the range of 60 nm to 85 nm R*M is far away from an optimum value. In particular, R*M is small since the second dielectric layer thickness preferred for that kind of disc is in the range of 12 nm to 20 nm where even higher $I_1$ thickness is required.

According to an advantageous embodiment of the present invention the $I_2$ layer thickness in regard to a high reflectivity and sensitivity is chosen to be about 28 nm for a recording stack comprising an aluminium mirror layer and 25 nm for a recording stack comprising a silver mirror layer. The corresponding $I_1$ layer thickness then in regard to a high R*M value is chosen to be about 135 nm and 130 nm, respectively. However, the $I_1$ layer thickness may be chosen differently in consideration of other parameters such as sensitivity, modulation or optical contrast but it should remain within a range of plus and minus 20 nm which range is indicated in FIGS. 3 and 4 by dashed lines 302, 402 and dotted lines 303, 403, respectively.

Furthermore, the dielectric layer $I_2$ 205 has a higher thermal resistance due to its increased thickness compared to common dielectric $I_2$ layers, see FIGS. 1 and two 2. Thus, the heat transport from the phase-change layer 204 to the mirror layer 206 is reduced. As the mirror layer acts as a heatsink less laser power is needed to heat the phase-change material to its melting temperature. In this way, a higher sensitivity of the recording stack according to present invention is obtained.

Figure 5:
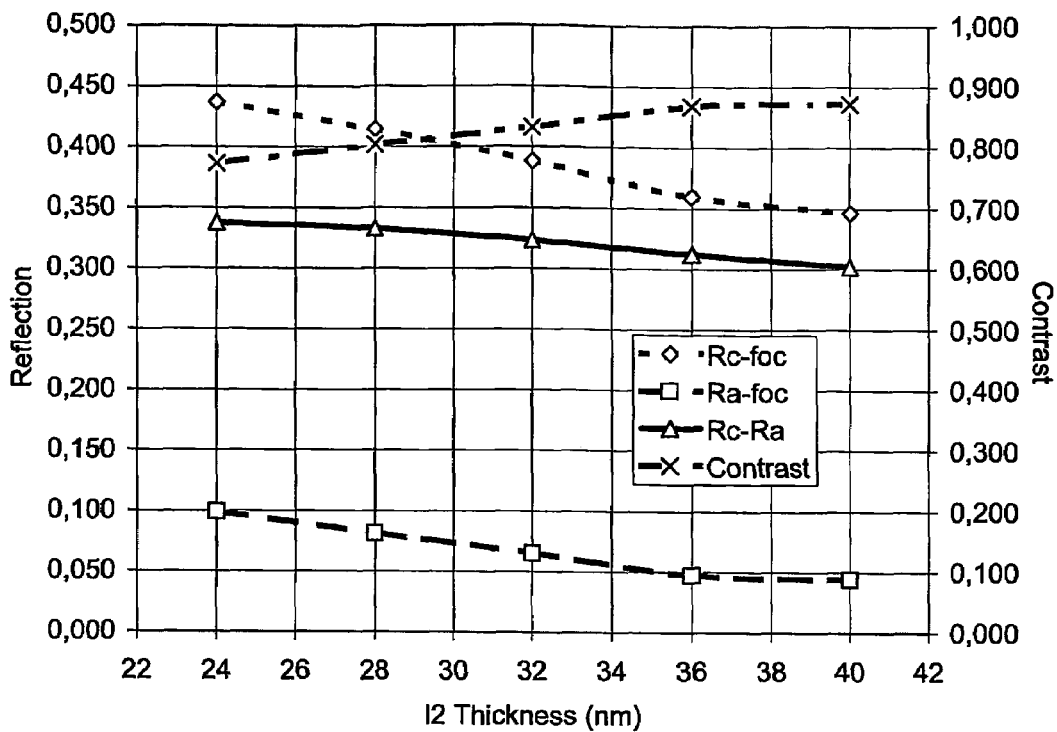
FIG. 5 shows the reflection signals $R_c$, $R_a$, the difference $R_c$-$R_a$, and the optical contrast of a reflected reading beam as a function of the thickness of $I_2$.
Figure 6:
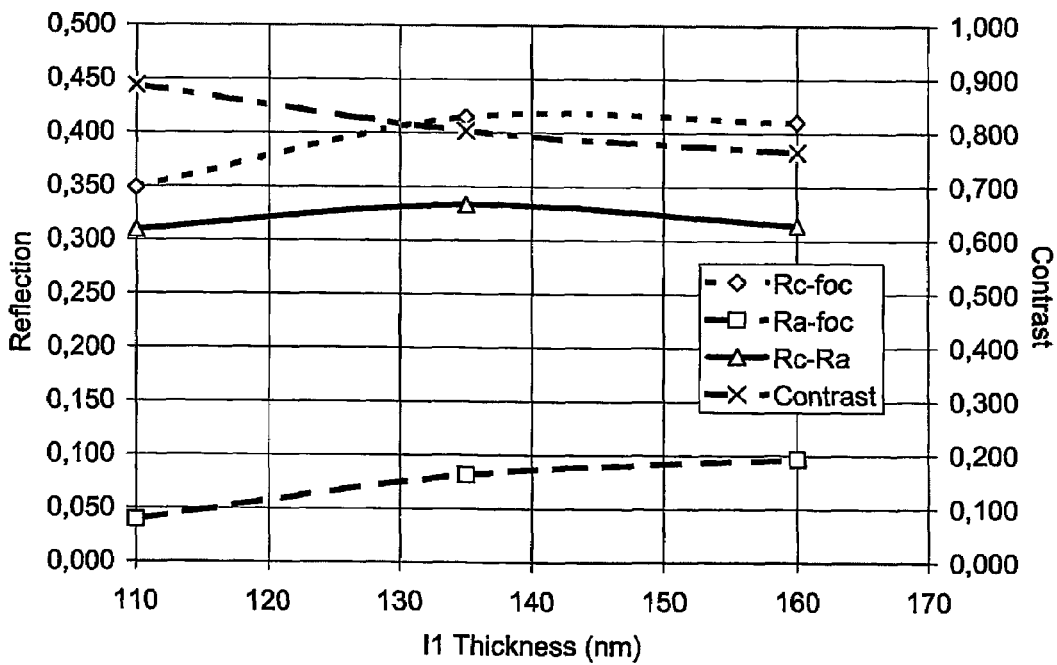
FIG. 6 shows the reflection signals $R_c$, $R_a$, the difference of $R_c$-$R_a$, and the optical contrast of the reflected reading beam as a function of the thickness of $I_1$.

The results from a RTM measurement of a the second recording stack L1 within a record carrier according to a number of advantageous embodiments is shown in FIGS. 5 and 6. According to this embodiment the PC layer has a thickness of 12 nm. It can, however, be chosen in a range of ±1.5 nm, wherein, said $R_c$ and $R_a$ values hardly change. Whereas, the difference in optical phase between the crystalline and the amorphous (structural) state of the recording PC material changes dramatically within this range. This property can be utilized to optimize for push-pull variations. The mirror layer used in this experiment, which is composed of a mixture of Al with addition of 1.5% Ti, is 50 nm thick. In FIG. 5 the focussed reflection signals $R_c$, $R_a$, the difference of both $R_c-R_a$, and the optical contrast are shown as a function of the thickness of the $I_2$ layer. Thereby, the thickness of the $I_1$ layer is adapted in consideration of a maximum R*M value, see FIG. 3. In FIG. 6 the corresponding results are shown as function of the thickness of the $I_1$ layer, whereby the thickness of the $I_2$ layer was fixed to 28 nm.

The reflection of the crystalline phase $R_c$ (diamond symbols) as well as the reflection of the amorphous phase $R_a$ (square symbols) decrease with increasing $I_2$ thickness, see FIG. 5, and, correspondingly, increase when choosing thicker $I_1$ layers, see FIG. 6. It can be seen from FIG. 6 that an $I_1$ layer thickness of 135 nm results in the maximum R*M, i.e. the maximum $R_c-R_a$ (triangle symbols). According to FIG. 3, this value corresponds to a $I_2$ value of about 28 nm. By this means the R*M can be increased up to 33% or more, whereas, normal production discs only have 25%.

The contrast (cross symbols) which is a normalized reflection value, i.e. $R_c-R_a$ divided by the crystalline phase reflection $R_c$, due to the rapidly growing crystalline phase reflection $R_c$ decreases to a value of 80% in that region.

Figure 7:
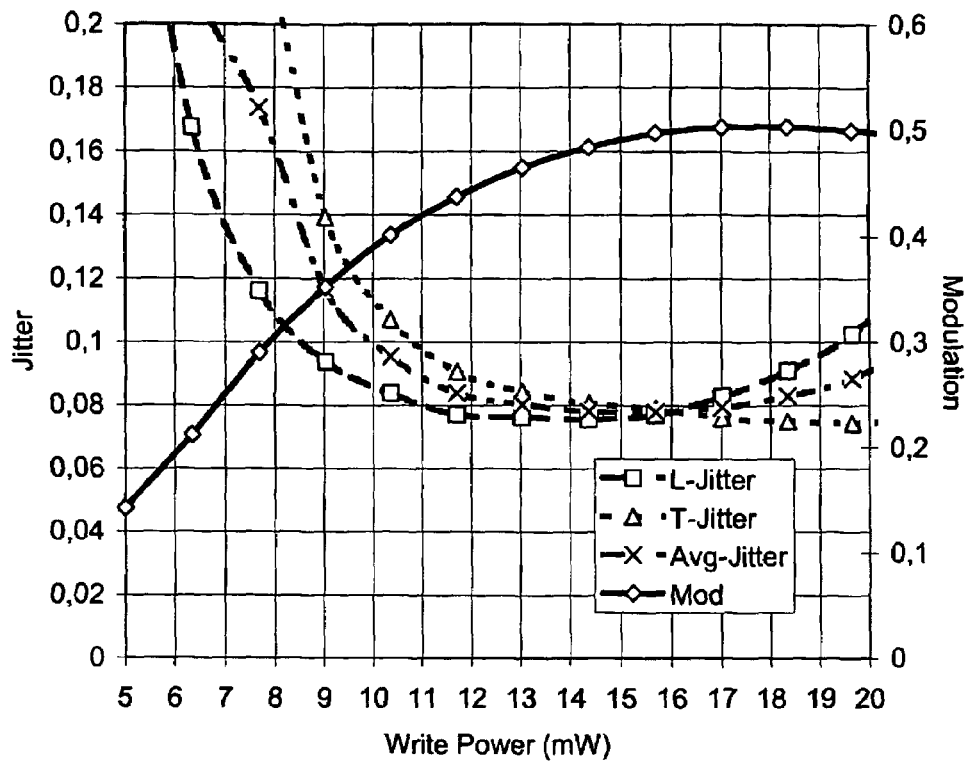
FIG. 7 shows the jitter and the modulation of a rewritable optical record carrier according to present invention comprising a single recording stack depending on the writing power.
Figure 8:
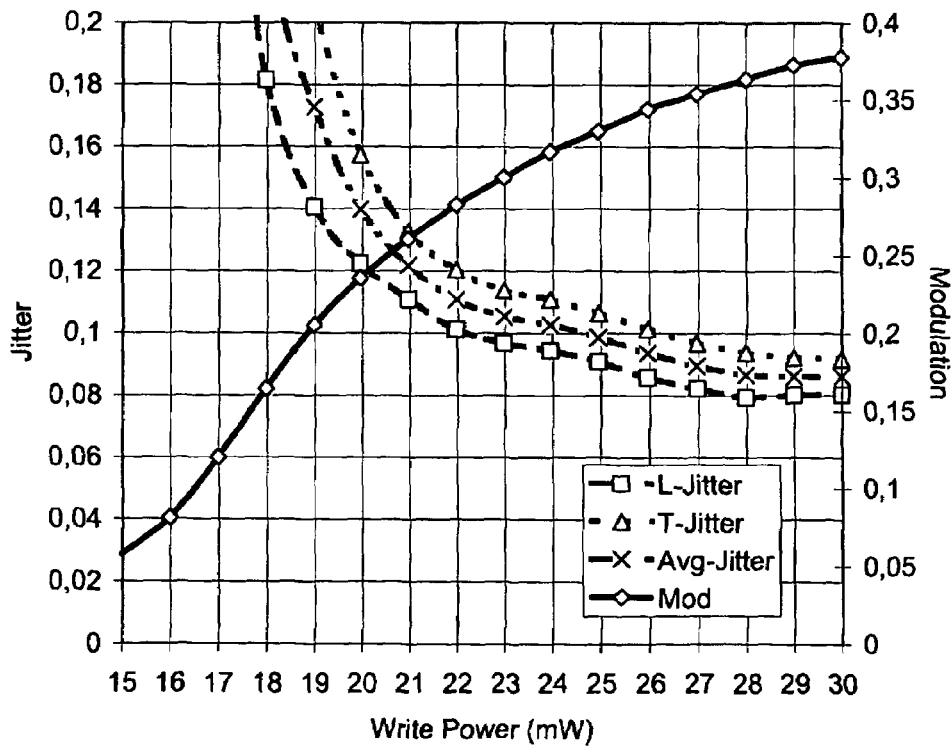
FIG. 8 shows the jitter and the modulation of a rewritable optical record carrier according to present invention recording comprising two recording stacks depending on the writing power.

The dependence of the modulation and the jitter on the writing power of the laser beam in an optical disc according to another advantageous embodiment having a single recording MIPI stack $L_1$ is shown in FIG. 7, whereby, the laser beam is focused on the $L_1$ recording stack through a polycarbonate dummy layer as $L_0$ stack. The same dependence on the writing power in a dual recording stack disc as proposed by the present invention is shown in FIG. 8, whereby, the laser beam is focused on the MIPI recording stack $L_1$ through an IPIM recording stack $L_0$ with a transmitivity of about 45%. The structure of the $L_1$ stack in both record carriers is as follows:

First dielectric layer: ZnS—$SiO_2$, 130 nm,
PC-recording layer: GeInSbTe, 12 nm,
Second dielectric layer: ZnS—$SiO_2$, 32 nm,
Mirror layer: AlTi, 50 nm.

From both recording experiments on $L_1$ stacks in single as well as in dual layer configuration it was found that $I_2$ thickness should be in the range of 20 nm to 40 nm in order to obtain a correct sensitivity. Otherwise, below this range the writing power required for recording becomes to high. Above this range repeated read problems will occur.

Further, FIG. 7 shows that when the disc comprises a single $L_1$ recording stack only with a transparent dummy layer on top a low writing power of about is 12 mW is sufficient for writing, thereby, obtaining a modulation of 45% and more and a minimum jitter of less than 10%. Since the proposed stack is so sensitive it can be used in a dual layer disc as $L_1$ stack too, see FIG. 8. With still reasonable writing powers of less than 30 mW a low jitter and a good modulation is obtained in such dual recording stack configuration.

It is noted that the present invention is not restricted to the above preferred embodiments. Other recording layer materials, dielectric layer materials substrate materials and/or reflection layer materials may be applied. Furthermore, the invention is not restricted to optical record carriers having a dual recording stack configuration as described herein above. A more compatible single layer optical record carrier of the IPIM type may be provided having a single recording layer stack according to FIG. 2 with the same optical properties and layer thickness proposed herein above but which is deposited as a $L_0$ layer onto a dummy layer. Further, a multiple recording stack design with more than two recording layers with the optical properties according to the present invention may be provided.

The invention claimed is:

1. A rewritable optical record carrier comprising a substrate carrying a first recording stack of layers, which first recording stack comprises, in this order or in reverse order,
   a first dielectric layer,
   a recording layer comprising a phase-change recording material,
   a second dielectric layer, and
   a mirror layer, composed of a mixture comprising aluminum as a main component or composed of a mixture comprising silver as a main component,
   characterized in that said first dielectric layer has a thickness $d_1$ in the range of 100 nm to 200 nm, and said second dielectric layer has a thickness $d_2$ according to one of the following relations a) when the mirror layer comprises aluminum $$0.0225*d_2^2-2.6572*d_2+173.3 \text{ (nm)} < d_1 < 0.0225*d_2^2-2.6572*d_2+213.3 \text{ (nm)}$$

b) when the mirror layer comprises silver $$0.0191*d_2^2-2.0482*d_2+149.6 \text{ (nm)} < d_1 < 0.0191*d_2^2-2.0482*d_2+189.6 \text{ (nm)}.$$

2. A rewritable optical record carrier according to claim 1, characterized in that said second dielectric layer has a thicknessin the range of 20 nm to 50 nm.

3. A rewritable optical record carrier according to claim 2, characterized in that said first dielectric layer has a thickness in the range of 110 nm to 150 nm, and said second dielectric layer has a thickness in the range of 25 nm to 40 nm.

4. A rewritable optical record carrier according to claim 3, characterized in that said first and second dielectric layers comprise a mixture of ZnS and $SiO_2$.

5. A rewritable optical record carrier according to claim 4, characterized in that said phase-change recording material comprises a mixture of Ge, In, Sb, and Te and that said recording layer has a thickness in the range of 12±1.5 nm.

6. A rewritable optical record carrier according to claim 1, characterized in that it further comprises
a spacer layer attached to said first dielectric layer, and
a second recording stack deposited on said spacer layer.

7. A rewritable optical record carrier according to claim 1, characterized in that it further comprises a dummy substrate disposed onto the first dielectric layer.

* * * * *